T857,014

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 367

564,010

MONOAZO COMPOUNDS CONTAINING A THIOMORPHOLINE-1-OXIDE GROUP

George F. Converse and Gerald L. Mayberry, both % Tennessee Eastman Company, P.O. Box 511, Kingsport, Tenn. 37662

Filed July 11, 1966. Published Dec. 10, 1968

Class 260—152

No Drawing. 13 Pages Specification

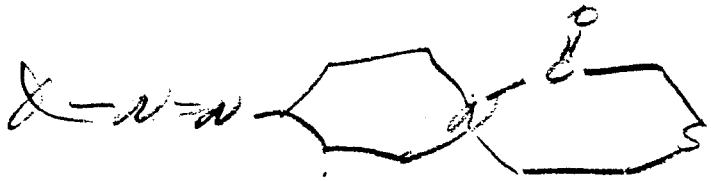

Water-insoluble phenyl-azo-aniline compounds in which the nitrogen atom of the aniline coupling component is a ring member of a thiomorpholine-1-oxide group. The disclosed compounds are useful as dyes for hydrophobic textile materials such as cellulose acetate, polyester and nylon fibers.